(12) United States Patent
Haag et al.

(10) Patent No.: US 10,351,005 B2
(45) Date of Patent: Jul. 16, 2019

(54) VEHICLE CHARGING SYSTEM

(71) Applicant: Ford Global Technologies, LLC, Dearborn, MI (US)

(72) Inventors: Jeffrey Matthew Haag, Dearborn, MI (US); Michael E. Reibling, Sterling Heights, MI (US); Lucas Amber, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 15/648,834

(22) Filed: Jul. 13, 2017

(65) Prior Publication Data

US 2019/0016218 A1    Jan. 17, 2019

(51) Int. Cl.
| | | |
|---|---|---|
| *H02J 7/00* | (2006.01) | |
| *B60L 11/18* | (2006.01) | |
| *B60L 53/16* | (2019.01) | |
| *H01R 13/631* | (2006.01) | |

(52) U.S. Cl.
CPC .......... *B60L 11/1818* (2013.01); *B60L 53/16* (2019.02); *H02J 7/0042* (2013.01); *H01R 13/6315* (2013.01); *H01R 2201/26* (2013.01)

(58) Field of Classification Search
CPC ..... Y02T 90/14; Y02T 90/125; Y02T 90/162; H02J 7/0027; H02J 7/0045; H02J 7/0036; H02J 7/0044

USPC ................. 320/104, 109, 113, 115
See application file for complete search history.

(56) References Cited

U.S. PATENT DOCUMENTS

| | | | | |
|---|---|---|---|---|
| 5,821,731 A | * | 10/1998 | Kuki ................... | B60L 11/1805 320/108 |
| 5,850,135 A | | 12/1998 | Kuki et al. | |
| 2010/0234844 A1 | * | 9/2010 | Edelhauser ............ | A61B 17/62 606/56 |

FOREIGN PATENT DOCUMENTS

| | | |
|---|---|---|
| DE | 2519976 A1 | 11/1976 |
| EP | 2684733 A1 | 1/2014 |

* cited by examiner

*Primary Examiner* — Nghia M Doan
(74) *Attorney, Agent, or Firm* — Brooks Kushman P.C.

(57) ABSTRACT

A charge system includes a base, a platform including a projecting plug, at least three interlinked legs, and a first and second sets of articulating joints. The at least three interlinked legs are of a fixed same length and are mechanically biased to be perpendicular to the base. The first and second sets of articulating joints respectively connect opposite ends of the legs with the platform and base such that, responsive to a force on the plug, the legs tilt while remaining parallel to each other and the platform remains parallel with the base.

9 Claims, 5 Drawing Sheets

VEHICLE CHARGING SYSTEM

TECHNICAL FIELD

This disclosure relates to a vehicle charging system for a traction battery, and in particular, to a vehicle charge connector, receptacle, and configuration.

BACKGROUND

Battery electric vehicles (BEV's) and plug in hybrid electric vehicles (PHEV's) (collectively referred to as EVs or xEVs) may use an electric motor as their primary or only source of motive power. A BEV or PHEV typically requires an external power source in order to charge the vehicle mounted battery pack which powers the motor.

Increasing popularity and sales of battery electric vehicles (BEV's) and plug in hybrid electric vehicles (PHEV's) have led to advances in vehicle and charging system technology. The use of a charge cord to plug a vehicle into a power grid may be viewed as an inconvenience by potential BEV and PHEV owners. One way to allow the charging of a vehicle without having to physically plug the vehicle into a power grid is through the use of an inductive wireless charging system. Such inductive wireless charging systems are commonly used in electronic devices such as electric toothbrushes and cell phones. Inductive wireless charging systems are now being proposed for charging BEVs and PHEVs.

SUMMARY

A charge system includes a base, a platform including a projecting plug, at least three interlinked legs, and a first and second sets of articulating joints. The at least three interlinked legs are of a fixed same length and are mechanically biased to be perpendicular to the base. The first and second sets of articulating joints respectively connect opposite ends of the legs with the platform and base such that, responsive to a force on the plug, the legs tilt while remaining parallel to each other and the platform remains parallel with the base.

A vehicle includes a frustrum surface and a receptacle. The receptacle is at an apex of the frustrum surface and defines a guide surface such that a plug, when inserted with a rotational offset, is rotated to alignment responsive a force applied by the guide surface prior to contact between electric contactors of the plug and receptacle.

A vehicle charging station includes an electric plug, a parallel manipulator, and an actuator. The electrical plug has a guide mechanism and is coupled with a platform via a twisting joint. The parallel manipulator has at least three legs and is configured to support the platform. The actuator is configured to move the parallel manipulator and plug along a central axis of the parallel manipulator.

DETAILED DESCRIPTION

Figures 1A, 1B:
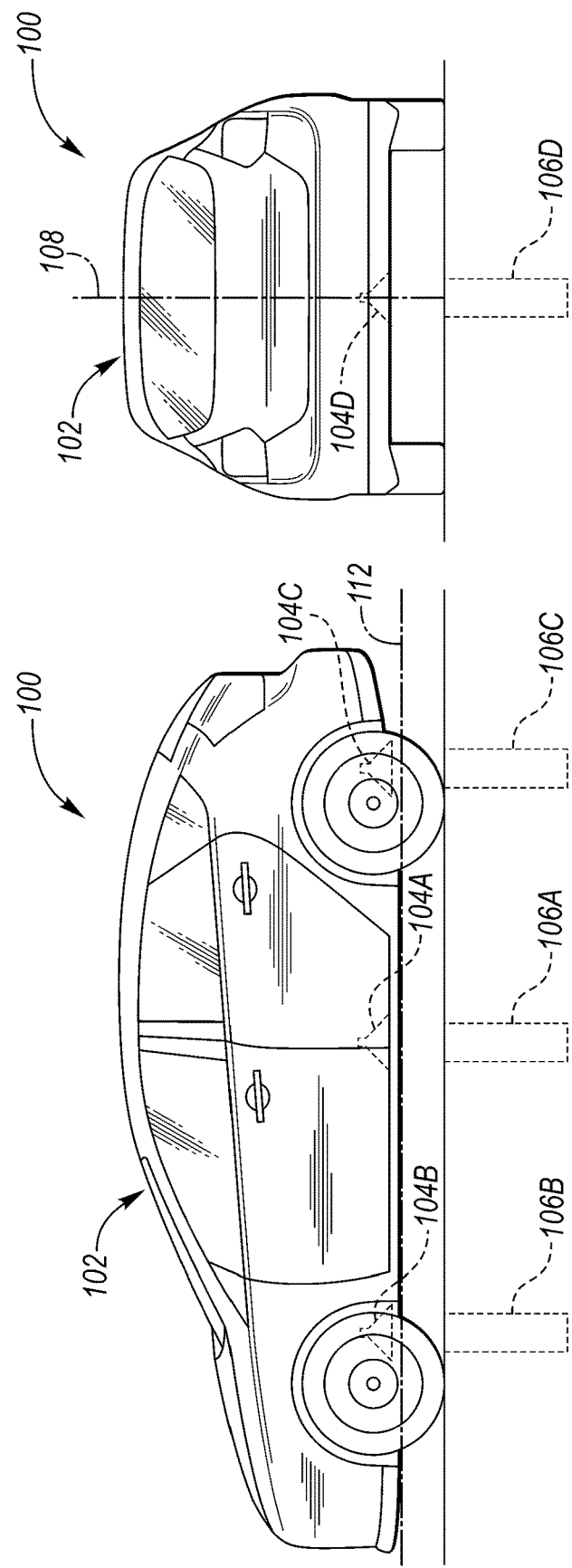
FIG. 1A is a side view illustration showing locations of a conductive charge system for a vehicle.
FIG. 1B is a rear-view illustration showing locations of a conductive charge system for a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As a number of electrified vehicles increases, variants of electric vehicles that require charging also increase. Current charging methods for electric vehicles, PHEVs and BEVs rely on a user to connect a charge cable to the vehicle. Many users and vehicle owners find this task an inconvenience. Further, with the onset of autonomous vehicles and applications, connecting a charge cord may require personnel to connect and disconnect these vehicles for charging.

Here, a system and structure to couple a vehicle to a charge station is presented such that a vehicle can be autonomously coupled with an electric vehicle supply equipment (EVSE) charge station without any human intervention, thus saving time and money. Here a structure is disclosed that deploys and stow automatically when a vehicle is in position. The structure is configured to compensate for parking variations by guiding a ground connector to the mating connector in the vehicle. In one embodiment, charge port mechanism is built into the ground within a parking space and is configured to extend upward to couple a connector of the charge port with a connector of the vehicle. The deployment may be automatically, or manually activated. These charge ports utilize an automated system designed to self-locate a conductive coupling.

In one embodiment, the mechanical system utilizes a system of linkages and geometries to guide a connector into its charge port given a force supplied from an actuator.

In order for this system to work, the vehicle must park over the charger within a given degree of accuracy. The connector for the charger is embedded in the ground at a location that is common for the vehicle and charger system. The connector is designed to actuate along the Z axis through the use of a powered actuator, this can be hydraulic, electrical, pneumatic, etc. For this disclosure, the charge port on the vehicle is placed between the wheels of the front of the vehicle, though it is not limited to this position. The charge port funnel (e.g., a frustro-conical surface which is the lateral surface of a conical frustrum) of the vehicle must overlap the center of the charger connector from the ground.

FIG. 1A is a side view illustration showing possible locations of a conductive charge receiver on a vehicle and the associated locations of matching electric vehicle supply equipment (EVSE) structures. A conductive charge system 100 includes a vehicle 102, a receiver location 104 capable of supporting and housing a conductive charge receiver assembly and a charge supply assembly location 106 where a conductive supply assembly may be located. A first embodiment is illustrated in which a conductive charge receiver assembly location 104A is located near the center or passenger area of a vehicle allowing a vehicle to conductively couple with a charge supply assembly located at a central location 106A of a charge station parking space. A second embodiment is illustrated in which a charge receiver assembly location 104B is located near the engine compartment allowing a vehicle to conductively couple with a charge supply assembly located at a front location 106B of a charge station parking space. A third embodiment is illustrated in which a charge receiver assembly location 104C is located near the rear of a vehicle allowing the vehicle to conductively couple with a charge supply assembly located at a rear area 106C of a charge station parking space. FIG. 1A also illustrates a ground clearance line 112 above which the charge receiver is maintained. The charge supply assembly moves from the ground surface to above the clearance line 112 when deployed.

FIG. 1B is a rear-view illustration showing locations of a conductive charge system for an electrified vehicle. The conductive charge system 100 includes a vehicle 102, a receiver location 104 capable of supporting and housing a conductive charge receiver assembly and a charge supply assembly location 106. In one embodiment, a charge receiver assembly location 104D and a charge station supply assembly location 106D are located intersecting the medial plane of the vehicle 102. In another embodiment, the charge station supply assembly location 106D is offset from the medial plane 108 and a charge receiver assembly location 104D is offset from the medial plane 108 such that the charge receiver assembly does not intersect the medial plane 108.

Figure 2:
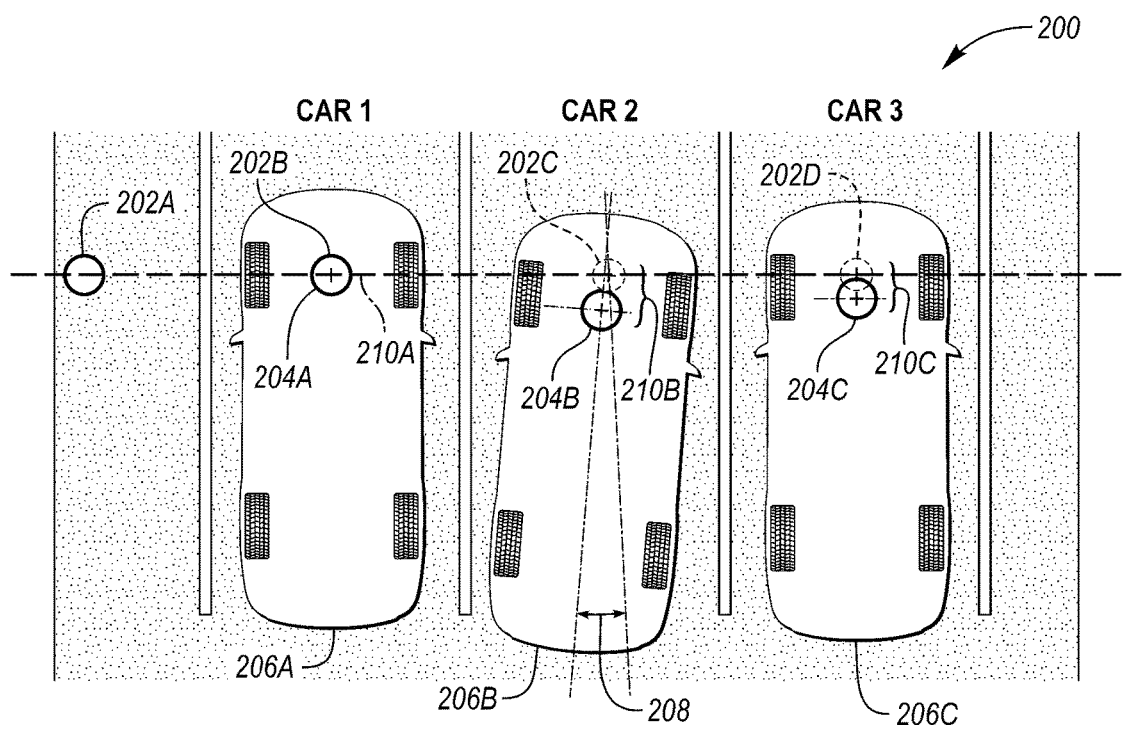
FIG. 2 is an overhead view of vehicle placement with respect to alignment of a conductive charge system.

FIG. 2 is an overhead view of vehicle placement with respect to alignment of a conductive charge system of an EVSE. An electric vehicle charge system 200 includes one or more supply assemblies 202 associated with electric vehicle charge station parking spots. For example, in this illustration four parking spots are shown each having an associated charge supply assembly location. The first parking spot has a first supply assembly 202A, the second parking spot has a second supply assembly 202B, the third parking spot has a third supply assembly 202C, and the fourth parking spot has a fourth supply assembly 202D. In this illustration, the supply assemblies 202 are located along a midline of the parking spot width and offset from the middle of the parking spot length. Car 1 206A is in the second parking spot such that the charge receiver 204A is aligned with the supply assembly 202B such that the offset 210A is approximately zero. In this position, the receiver and supply assembly are easily coupled as no alignment corrections need to be made. Car 2 206B is parked with both a linear offset and rotational offset. The linear offset 210B is defined by a distance from the charge receiver 204B and the supply assembly 202C. The rotational offset 208 is defined by an angle from a central axis of the charge receiver 204B and a central axis of the supply assembly 202C. Car 3 206C is parked with only a linear offset 210C that is defined by a distance from the charge receiver 204C and the supply assembly 202D.

Figure 3:
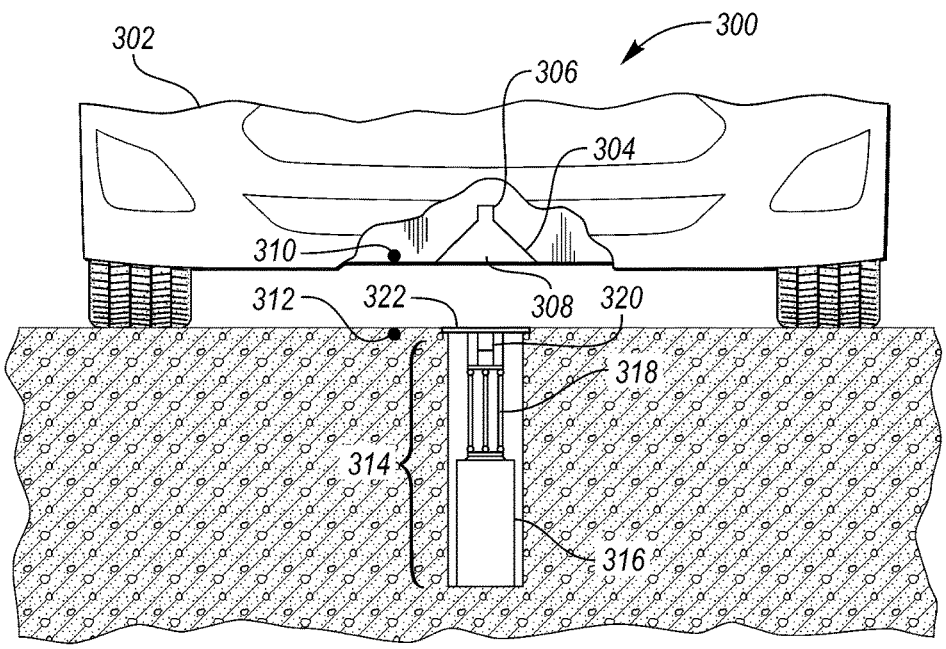
FIG. 3 is a frontal cross sectional view of a conductive charge system receiver assembly in a retracted position.

FIG. 3 is a frontal cross sectional view of an electric vehicle charge system 300 including a conductive charge supply assembly 314 in a retracted position and a conductive charge receiver assembly. The conductive charge receiver assembly, as shown, is coupled with an electric vehicle 302. The conductive charge receiver assembly includes a frusto-conical surface 304, a receptacle 306, a protective structure 308, and a wireless transceiver 310. The conductive charge supply assembly 314 includes a transceiver 312, an actuator 316, a platform manipulator 318, a connector 320, and a protective structure 322. The transceiver 312 is configured to wirelessly transfer information with the vehicle's wireless transceiver 310. In this disclosure, the term frustrum, includes the basal part of a solid cone formed by cutting off the top by a plane parallel to the base, and also includes an embodiment in which the planes are not parallel but may be up to +/−10 degrees of parallel. Further, the solid cone includes a figure bounded by a base (e.g., a circle) in a plane and by a surface (e.g., lateral surface) formed by a locus of line segments joining the apex to the perimeter of the base. In this disclosure, the lateral surface may include, along with straight line segments, line segments that have a degree of curvature. The degree of curvature may be such that the radius is at least 2 times the arc length. The curvature may be concave or convex to assist in alignment as the connectors are coupled. A frustro-conical surface is a type of frustrum, and a frustrum surface is the lateral surface of the frustrum.

The wireless transceivers (410 and 412) may include radio frequency wireless transceiver, optical transceiver, and infrared transceivers. Also, in this disclosure, the wireless transceivers includes wireless transponders, such as a radio frequency identification in which an automated transceiver 410 in the vehicle 402 emits a coded identifying signal in response to an interrogation signal received from the EVSE transceiver 412. The wireless communication include short-range wireless communication in which signals travel from a few centimeters to several meters. Examples of short-range wireless communications include Bluetooth, infrared, some near-field-communication (NFC) protocols, ultra-wideband (UWB), wireless USB, and Zigbee. Bluetooth and Zigbee are standards described in 802.15.x of the Institute of Electrical and Electronics Engineers (IEEE).

UWB transmissions transmit information by generating radio energy at specific time intervals over a large bandwidth, thus capable of enabling pulse-position or time modulation. The information may be modulated on UWB signals (e.g., pulses) via pulse polarity encoding of the amplitude and/or by the use of orthogonal pulses.

Figure 4:
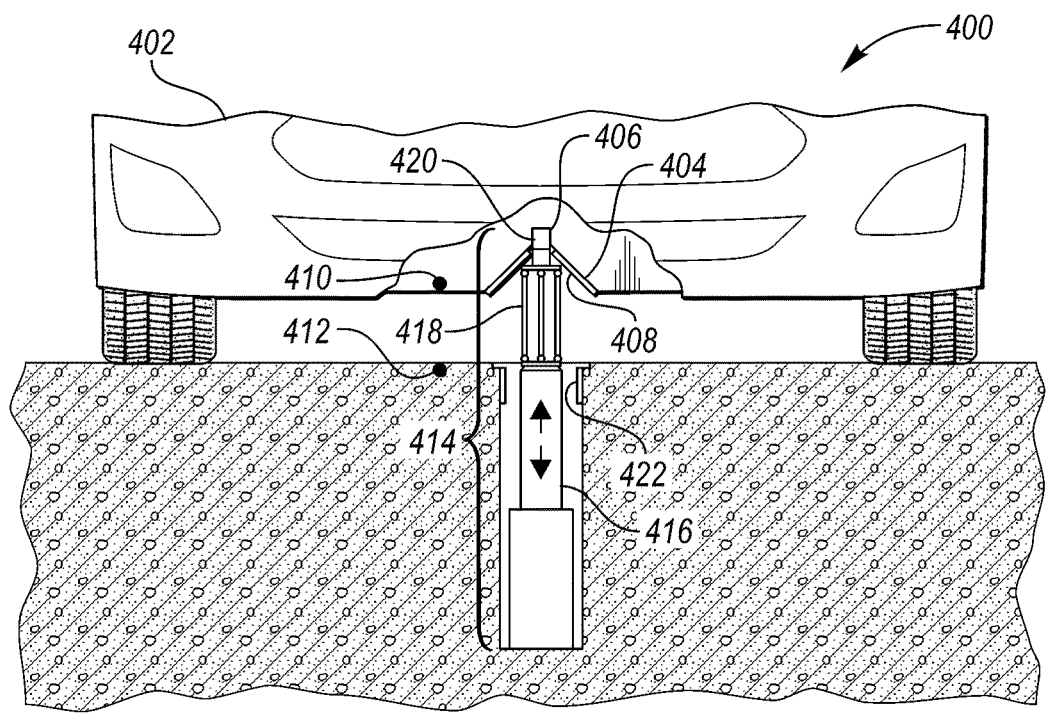
FIG. 4 is a frontal cross sectional view of a conductive charge system receiver assembly in a deployed position.

FIG. 4 is a frontal cross sectional view of an electric vehicle charge system 400 including a conductive charge supply assembly 414 in a deployed position and a conductive charge receiver assembly. The conductive charge receiver assembly, as shown, is coupled with an electric vehicle 402. The conductive charge receiver assembly includes a frusto-conical surface 404, a receptacle 406, a protective structure 408, and a wireless transceiver 410. The conductive charge supply assembly 414 includes a transceiver 412, an actuator 416, a platform manipulator 418, a connector 420, and a protective structure 422. The transceiver 412 is configured to wirelessly transfer information with the vehicle's wireless transceiver 410. Here, when deployed, the protective structure 422 shown as doors are folded down to allow the platform manipulator 418 to be extended into position by the actuator 416. In other embodiments, the protective structure 422 may slide out of the way or fold in an alternative direction. Likewise, the protective structure 408 is folded up as the platform manipulator 418 and connector 420 are raised by the actuator 416. In this illustration, the connector 420 is in alignment with the receptacle 406 such that the platform manipulator 418 does not articulate horizontally to reach alignment. The wireless transceivers 410, 412 may be used to provide vehicle identification, vehicle status (e.g., battery type, chemistry, state of charge, etc.), billing information, and preferences. The charge port covers 422 and receptacle cover 408 are uncovered as the actuator deploys from the connection system.

Figure 5:
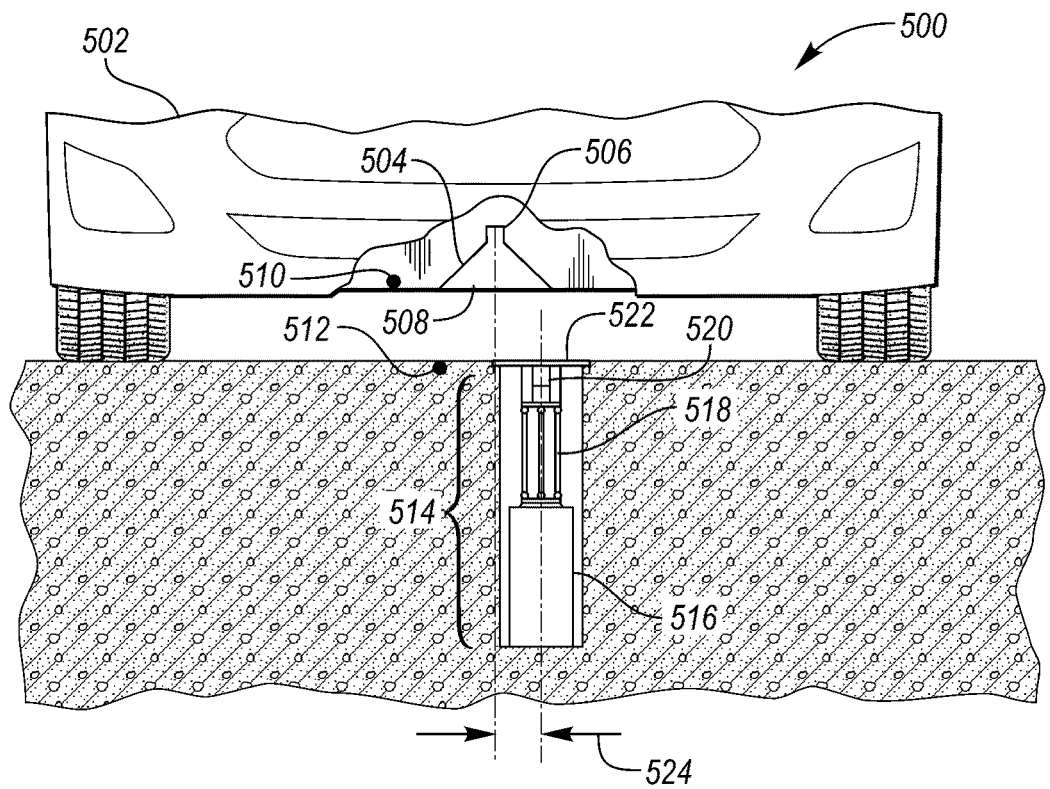
FIG. 5 is a frontal cross sectional view of a conductive charge system receiver assembly in an offset retracted position.

FIG. 5 is a frontal cross sectional view of an electric vehicle charge system 500 including a conductive charge supply assembly 514 in an offset retracted position to a conductive charge receiver assembly. The conductive charge receiver assembly, as shown, is coupled with an electric vehicle 502. The conductive charge receiver assembly includes a frusto-conical surface 504, a receptacle 506, a protective structure 508, and a wireless transceiver 510. The conductive charge supply assembly 514 includes a transceiver 512, an actuator 516, a platform manipulator 518, a connector 520, and a protective structure 522. The conductive charge supply assembly 514 and conductive charge receiver assembly has an offset 524, such that the connector 520 will not mate with the receptacle 506 when moved in a up vertically without any horizontal adjustments. The transceiver 512 is configured to wirelessly transfer information with the vehicle's wireless transceiver 510.

Figure 6:
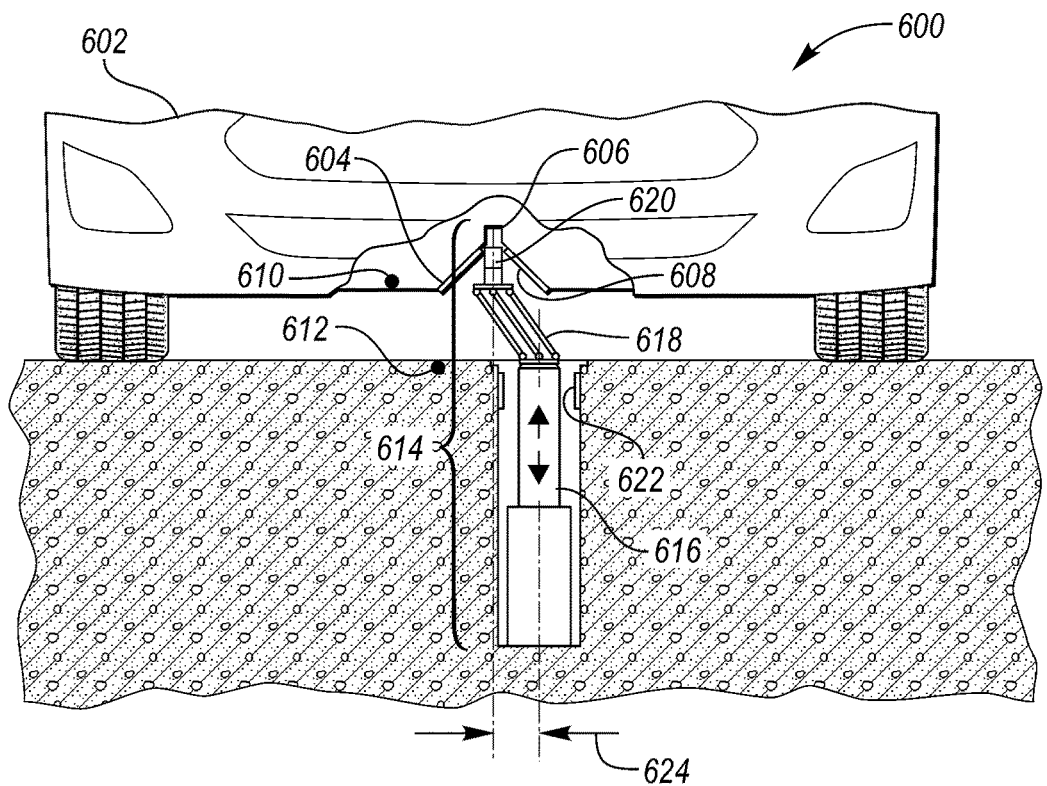
FIG. 6 is a frontal cross sectional view of a conductive charge system receiver assembly in an offset deployed position.

FIG. 6 is a frontal cross sectional view of an electric vehicle charge system 600 including a conductive charge supply assembly 614 in an offset deploying position to a conductive charge receiver assembly. The conductive charge receiver assembly, as shown, is coupled with an electric vehicle 602. The conductive charge receiver assembly includes a frusto-conical surface 604, a receptacle 606, a protective structure 608, and a wireless transceiver 610. The conductive charge supply assembly 614 includes a transceiver 612, an actuator 616, a platform manipulator 618, a connector 620, and a protective structure 622. The transceiver 612 is configured to wirelessly transfer information with the vehicle's wireless transceiver 610. The conductive charge supply assembly 614 and conductive charge receiver assembly has an offset 624, such that the connector 620 will not mate with the receptacle 606 when moved in a up vertically without any horizontal adjustments. In this illustration, the platform manipulator 618 is able to be guided to the receptacle 606 by traveling along the frusto-conical surface 604. The platform manipulator 618 is configured to translate the connector 620 along a 2-dimensional horizontal axis while the actuator 616 moves the platform manipulator 618 and connector 620 vertically.

Figure 7:
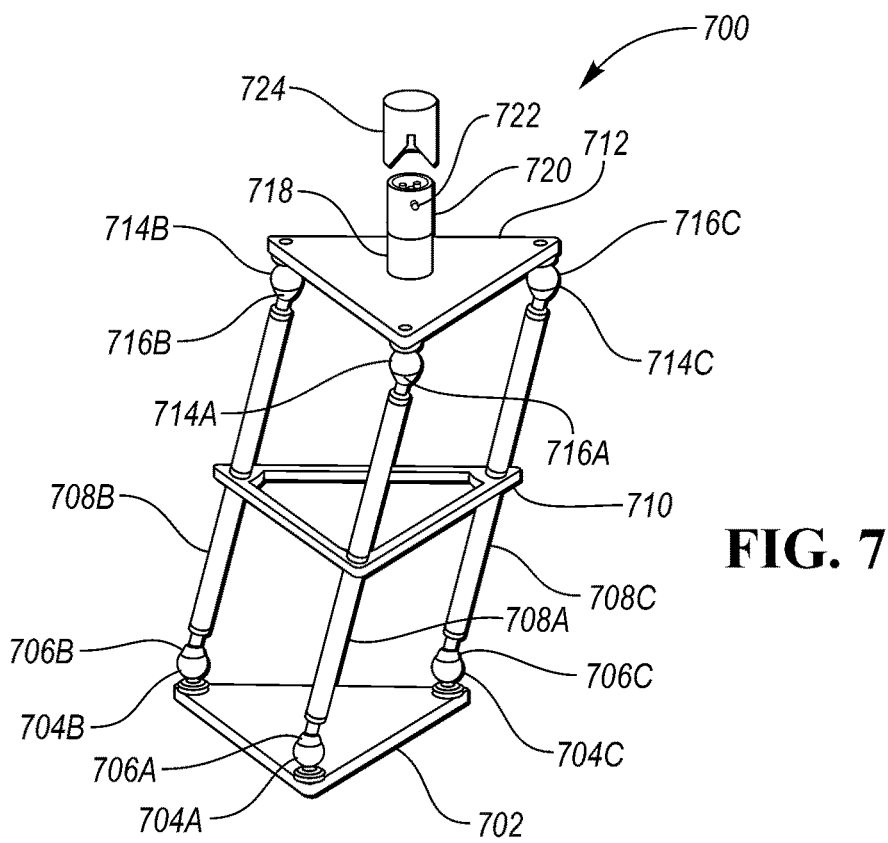
FIG. 7 is a perspective view of a floating linkage for a conductive charge system receiver assembly in an offset position.

FIG. 7 is a perspective view of a floating linkage 700 for a conductive charge system receiver assembly in an offset position. The floating linkage 700 includes a base 702 that has at least three joints (704A, 704B, 704C) coupling to rods (708A, 708B, 708C) by mating joints (706A, 706B, 706C). The rods (708A, 708B, 708C) are coupled with a top platform 712 via joints (714A, 714B, 714C) and mating joints (716A, 716B, 716C). A stabilizing brace 710 is used to maintain the rods parallel with each other such that a rotation or twist does not occur. The stabilizing brace 710 is used to maintain the base 702 parallel with the top platform 712. The top platform 712 includes a mount 718 and the connector 720. The connector 720 has a guide mechanism 722 (e.g., a pin, or guide surface) that is configured to cooperate with the receptacle 724.

The floating linkage 700 also referred to as a platform manipulator may be a 3-dimensional 4-bar linkage or a 3-dimensional parallelogram linkage. Generally, a 4-bar linkage, also referred to as a four-bar, is a movable closed chain linkage. It consists of four bodies, (e.g., bars or links), connected in a loop by four joints. Generally, the joints are configured so the links move in a single plane or parallel planes, and the assembly is called a planar four-bar linkage. A parallelogram linkage is a 4-bar linkage in which the two opposing bars are the same length such that the top bar (e.g., top platform) remains parallel with the base as the other two bars move. As a 4-bar linkage has 4 joints, the 3-dimensional 4-bar linkage (also referred to as a 9-bar linkage) has 9 bars or links and 6 joints. Like the parallelogram linkage, the 3-dimensional parallelogram linkage (also referred to as a paralleloplane linkage) has the 3 joints mirrors of the other three joints while the three connecting links are equal.

In another embodiment, the use of a Gough-Stewart platform (6-axis manipulator) may be used to control the top platform 712 and connector 720. This would allow a slight angle (e.g., <10 degrees) applied to the top platform 712 in the event that a tire has low air pressure, or there is a tilt in the suspension due to loading of the vehicle, attachment of a trailer, or operational conditions such as a broken spring or shock absorber.

The joints (704/706 and 714/716) are illustrated as ball and socket joints, however the joints may be a gimble joint or a universal-joint (U-joint). Further, the mount 718 and the connector 720 may be coupled via a rotating joint such that the connector may rotate to alignment with the receptacle 724. The rotating joint may include a spring to apply a force to reset the alignment before or after insertion. In some embodiments, the mount 718 and the connector 720 may be coupled via a wrist joint. The wrist joint is a joint that allows movement along three axis such that a pitch, yaw, and roll may be adjusted. This wrist joint may be spring loaded using a spring that applies a force less than the force used by the spring of the parallel mechanism such that alignment is reset before or after insertion. The connector 720 is electrically connected with the vehicle charge station via a conductor (not shown).

Figure 8A:
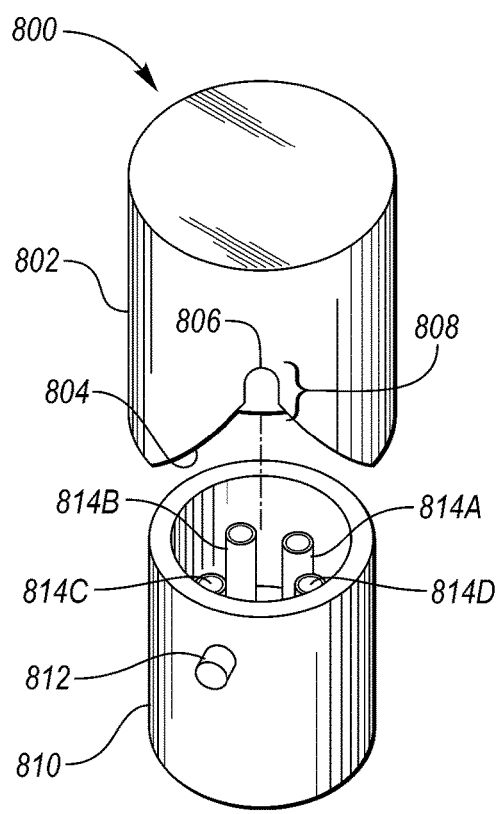
FIGS. 8A-8C are perspective views of a plug and receptacle of a conductive connector for a conductive charge system illustrating self-alignment.
Figure 8B:
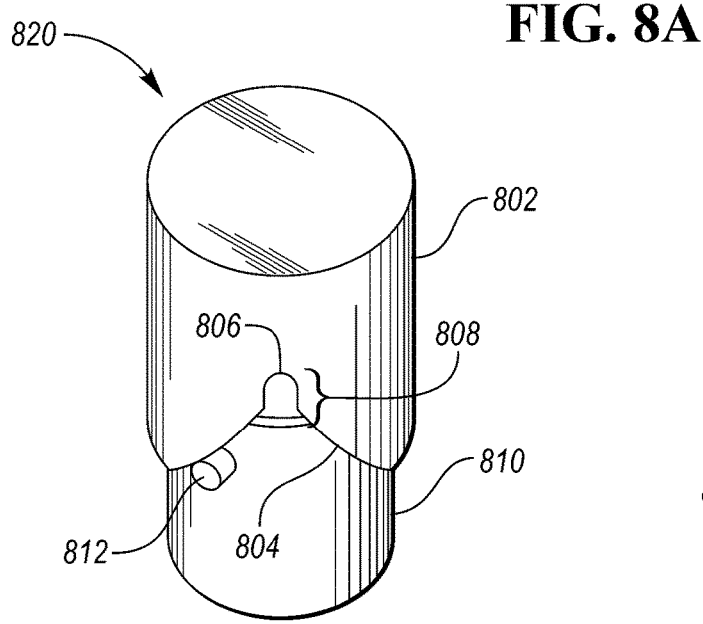
Figure 8C:
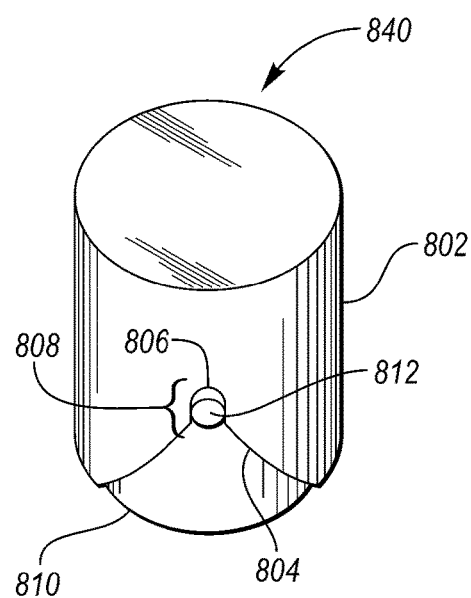

FIGS. 8A, 8B, and 8C are a perspective view of a plug and receptacle of a conductive connector for a conductive charge system illustrating self-alignment. The connector system 800 includes a receptacle 802, and a plug 810. The receptacle 802 includes a tapered surface 804, a slot 806 that has a length 808. The plug 810 includes a guide mechanism 812 (e.g., a guide pin), and electrical contacts (814A, 814B, 814C, and 814D). Connector system 800 is when the plug and receptacle are separated, and aligned with a rotation. As shown in illustration 820, the plug 810 is inserted into the receptacle 802, the guide pin 812 travels along the guide surface 804 thereby rotating the plug 810 with respect to the receptacle 802 As shown in illustration 840, once the plug 810 and receptacle 802 are aligned and the offset is reduced to approximately zero, the plug 810 may be inserted into the receptacle 802 a distance as determined by the length 808 of the slot 806.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charge system comprising:
   a base;
   a platform including a projecting plug;
   at least three interlinked legs of fixed same length mechanically biased to maintain the projecting plug to be perpendicular to the base; and
   first and second sets of articulating joints respectively connecting opposite ends of the legs with the platform and base such that, responsive to a force on the plug, the legs tilt while remaining parallel to each other and the platform remains parallel with the base.

2. The charge system of claim 1, wherein the projecting plug is coupled with the platform via a twisting joint such that the projecting plug can rotate about a central axis of the plug.

3. The charge system of claim 2, wherein the projecting plug includes a guide pin that is configured to cooperate with a receptacle that includes a tapered surface and slot, such that a rotation occurs between the plug and receptacle until the plug and receptacle are aligned, after which the receptacle is configured to accept the plug inserted to a depth as determined by a length of the slot.

4. The charge system of claim 2, wherein the twisting joint is a wrist joint.

5. The charge system of claim 1, wherein the at least three interlinked legs form a parallel manipulator.

6. The charge system of claim 5, wherein the parallel manipulator is a parallelogram linkage that is configured to maintain the platform parallel with a base of the manipulator.

7. The charge system of claim 5, wherein the parallel manipulator is a 3-dimensional parallelogram linkage.

8. The charge system of claim 1, wherein the at least three interlinked legs form a Gough-Stewart platform.

9. The charge system of claim 1 further including an actuator coupled with the base.

* * * * *